(12) United States Patent
Lowmaster

(10) Patent No.: US 9,100,237 B2
(45) Date of Patent: Aug. 4, 2015

(54) VOIP 911 ADDRESS LOCATOR SERVICE

(75) Inventor: Robert Lowmaster, Bartlett, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2465 days.

(21) Appl. No.: 11/316,400

(22) Filed: Dec. 22, 2005

(65) Prior Publication Data

US 2007/0147345 A1 Jun. 28, 2007

(51) Int. Cl.
*H04L 12/66* (2006.01)
*H04L 29/06* (2006.01)
*H04M 7/00* (2006.01)
*H04L 29/08* (2006.01)
*H04M 11/04* (2006.01)

(52) U.S. Cl.
CPC ...... *H04L 29/06027* (2013.01); *H04L 65/1069* (2013.01); *H04L 65/4007* (2013.01); *H04L 67/18* (2013.01); *H04M 7/006* (2013.01); *H04M 11/04* (2013.01); *H04M 2242/04* (2013.01); *H04M 2242/30* (2013.01)

(58) Field of Classification Search
CPC ............... H04M 2242/30; H04M 3/42059; H04M 15/06; H04M 1/57; H04M 1/663; H04M 2242/04; H04M 2242/14; H04M 3/54; H04M 3/42348; H04Q 3/005; H04L 61/157

USPC .......... 370/352; 455/404.1, 404.2; 340/572.1
See application file for complete search history.

(56) References Cited

U.S. PATENT DOCUMENTS

| | | | |
|---|---|---|---|
| 6,927,727 B2 | 8/2005 | Cleghorn | |
| 6,940,950 B2 | 9/2005 | Dickinson et al. | |
| 2003/0016804 A1* | 1/2003 | Sheha et al. | 379/201.06 |
| 2004/0057425 A1 | 3/2004 | Brouwer et al. | |
| 2004/0190497 A1 | 9/2004 | Knox | |
| 2005/0063519 A1 | 3/2005 | James | |
| 2005/0107074 A1 | 5/2005 | Zellner | |
| 2005/0108360 A1 | 5/2005 | Zellner | |
| 2005/0174991 A1 | 8/2005 | Keagy | |
| 2005/0175166 A1 | 8/2005 | Welenson et al. | |
| 2005/0207545 A1 | 9/2005 | Gao et al. | |
| 2005/0213565 A1 | 9/2005 | Barclay et al. | |
| 2005/0249193 A1* | 11/2005 | Epley | 370/352 |
| 2006/0077961 A1* | 4/2006 | Crago et al. | 370/352 |
| 2006/0188083 A1* | 8/2006 | Breen et al. | 379/221.13 |
| 2006/0293024 A1* | 12/2006 | Benco et al. | 455/404.2 |
| 2007/0013516 A1* | 1/2007 | Freitag et al. | 340/572.1 |

\* cited by examiner

*Primary Examiner* — Wutchung Chu
*Assistant Examiner* — Stephanie Chang

(57) ABSTRACT

A Voice over Internet Protocol (VoIP) device and method of operation of the VoIP device are provided. A local telephone number serving a location of the VoIP device is stored in a database of a VoIP service provider. A fixed address is associated with the local telephone number. The local telephone number is provided to an Automatic Location Information database associated with an emergency response system.

25 Claims, 4 Drawing Sheets

VOIP 911 ADDRESS LOCATOR SERVICE

TECHNICAL FIELD

This application relates to a system and method for VoIP service, and more particularly for a system and method for emergency location using VoIP.

BACKGROUND

Until recently, voice information was carried only over a network dedicated to the voice information, such as a public switched telephone network (PSTN). Presently, however, other technologies have been developed that enable voice to be carried via a variety of networks that are not exclusively dedicated to the transfer of voice information. One of these technologies is Internet telephony, also called voice over internet protocol telephony (VoIP). VoIP contains technologies that enable voice to be carried via a data network of the Internet. In a VoIP system, the analog signals from the voice of a caller are converted into digital signals by a VoIP device before being transmitted through a gateway. The gateway then routes the signals over the PSTN dependent on the setup of the VoIP provider. The digitized, voice signals accordingly travel as discrete packets over a public or private Internet. This saves costs over a conventional PSTN as there is no toll charge when making a call.

However, various problems exist with VoIP systems. One of these problems is determination of the location of a caller for purposes of emergency (medical, police, fire) assistance. To access emergency assistance, a caller dials 911 in the United States or Canada and is connected to a Public Safety Answering Point (PSAP). The PSAP is one or more entities that receives emergency calls and dispatches the appropriate emergency services, if necessary. As the basic emergency phone number is the same throughout the United States and Canada, the call is transmitted to one or more routers in a PSTN network of routers through a PSTN gateway to determine the appropriate PSAP to respond to the emergency call, that is, the PSAP most proximate physically to the caller. The appropriate PSAP is determined by using an Automatic Location Identification (ALI) database that associates telephone numbers with street addresses and local emergency response. Once the address is determined, it is transmitted to a display for the benefit of the emergency response personnel. Emergency services then react to a 911 call using the location of the caller.

When using a conventional non-portable telephone, the location of the telephone is known and registered as a particular location. However, the information used to route a VoIP call may not be sufficient to determine the location of the VoIP caller. Unlike fixed telephones, which each use a dedicated switch to connect to the PSTN network, a VoIP network uses one switch to serve multiple VoIP devices distributed over a broad geographic area. Moreover, VoIP devices are nomadic, that is, VoIP phones can be transported to any location where a network connection is available, connected to the Internet, and calls may be made from the new location. Thus, there is no fixed relationship between the location of a caller using a VoIP device and the phone number used by the VoIP device. Nor do VoIP networks generally provide information regarding the location of callers.

Thus, there is a need for a VoIP device and associated method in which emergency calls are routed to a proper emergency service provider for providing appropriate emergency response to the caller.

DETAILED DESCRIPTION

A system and method is provided for routing Voice over Internet Protocol (VoIP) emergency calls to a local emergency service provider. The system includes a VoIP device contains a display, a means for entering information, and a memory. The VoIP device is connectable to a VoIP network and a gateway, routers, and a table containing emergency response information. The VoIP device, after being disconnected from and then reconnected to a power source/network connection, prompts the user to enter the local telephone number if different from the last local telephone number stored. This local telephone number is provided to the router to provide the proper routing information automatically, without the caller having to provide it to a human operator. The local telephone number can be provided when the emergency number is called or prior to the emergency number being called.

Figure 1:
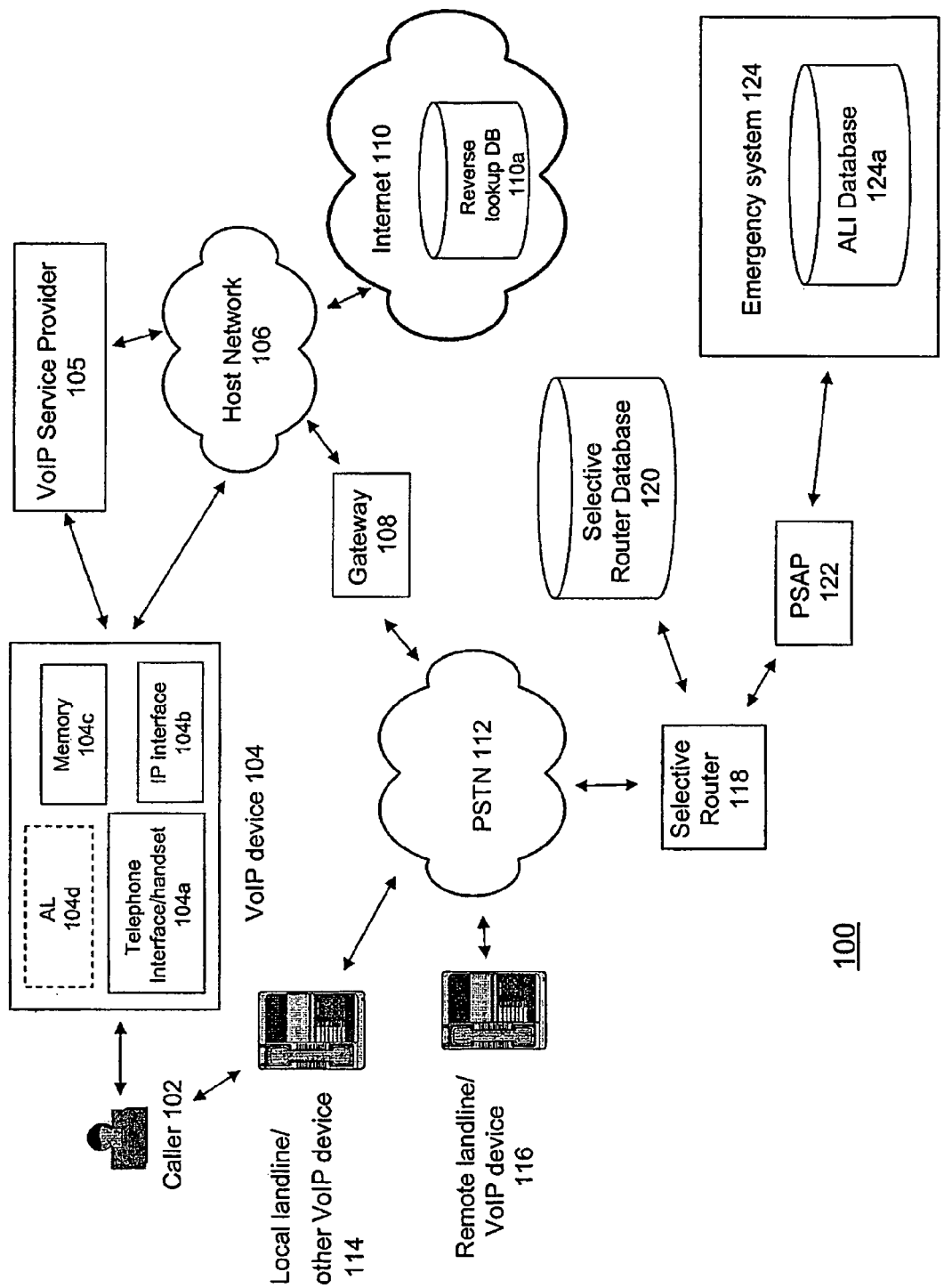
FIG. 1 illustrates an embodiment of a VoIP system.

FIG. 1 illustrates one embodiment of a VoIP system. The VoIP system 100 includes a VoIP device 104, a host network 106, a gateway 108, the Internet 110, a public switched telephone network (PSTN) 112, local and remote landlines and/or VoIP devices 114, 116, a Selective Router 118 and Selective Router database 120, a Public Safety Answering Point (PSAP) 122 and an emergency system 124. Other elements known in the art for VoIP devices and/or various network connections may be present but are not illustrated for clarity. In addition, all elements in the system, shown or not illustrated, that are connected together may use any suitable protocol to communicate with each other.

The VoIP device 104 includes a telephone interface (or handset) 104a through which a caller 102 receives or makes a telephone call, an IP interface 104b through which the VoIP device communicates with the VoIP service provider 105 on the host network 106, and a memory 104c that stores information. The VoIP device 104 may also include an automatic locator 104d illustrated by dotted lines. The memory 104c can store, for example, a telephone number of the current location, the address of the current location, and/or telephone numbers and addresses of recent locations to which the VoIP device 104 was transported, as well as instructions for communication and for carrying out the various routines and subroutines used to operate the VoIP device 104 in different modes. The VoIP service provider 105 can include a database for storing the user's address information of the user, as well as a soft switch for performing the call routing to the appropriate Selective Router 118. The host network 106 can include a local area network and/or a wide area network, among others. The Internet 110 includes multiple databases, including at least one reverse lookup directory 110a. The reverse lookup directory 110a is a directory that provides address and other information when provided with a telephone number. The emergency system 124 contains an Automatic Location Information (ALI) database 124a. As the PSTN 112, Selective Router 118 and Selective Router database 120, PSAP 122 and emergency system 124 are all well known in the art, the discussion below of these is limited.

The VoIP device 104 is connected through the host network 106 to the Internet 110 or to the PSTN 112 through the gateway 108. As the host network 106 may operate using a different technology than the PSTN 112, the gateway 108 acts as the interface between the host network 106 and the PSTN 112. For example, the host network 106 may use a packet-switched network to transmit telephone calls therethrough while the PSTN 112 may use a circuit-switched network to transmit telephone calls therethrough. The PSTN 112, in turn, is directly or indirectly connected to other local and remote landlines and/or VoIP devices 114, 116. The local and remote landlines and VoIP devices 114, 116 may be wired and/or wireless devices. The PSTN 112 is connected to one or more Selective Routers 118, which has the Selective Router database 120. The Selective Router database 120 is used in the selection of the appropriate PSAP 122 that should receive the incoming 911 call. The Selective Router 120 is also known as the Enhanced 911 (E911) Control Office, which is defined by the National Emergency Number Association (NENA) as "The Central Office that provides the tandem switching of 9-1-1 calls. It controls delivery of the voice call with ANI to the PSAP and provides Selective Routing, Speed Calling, Selective Transfer, Fixed Transfer, and certain maintenance functions for each PSAP. Also known as 9-1-1 Selective Routing Tandem or Selective Router". The "Central Office" may be a class 5 switch. Only one data base is used as the Selective Router Database by any one Selective Router, and this database is stored on the Class 5 switch that is serving as the Selective Router. The PSAP 122 is connected to the emergency system 124. The emergency system 124 is local to the PSAP 122 and provides the PSAP agent with the address information associated with the calling telephone number. This address information can then be displayed on the PSAP agent's computer screen along with the calling telephone number allowing the PSAP to provide emergency assistance in response to a phone call from a local caller to 911.

When the user (or caller) 102 of the VoIP device 104 makes a call, the VoIP device 104, under the direction of the VoIP service provider 105, connects through the host network 106 to a gateway 108. The VoIP service provider 105, instructs the gateway 108 to connect the VoIP device 104 to the PSTN 112 using a conventional user authentication protocol. In addition to this user authentication protocol, port location information is transmitted to the network to which the caller 102 is to be connected. If the call for emergency assistance is made using the VoIP device 104, the location information is eventually provided to the ALI database 124a and may be used to update the ALI database 124a.

More particularly, the Selective Router database 120 communicates with the Selective Router 118 in order to provide correct routing of the emergency calls to the proper PSAP 122. The Selective Router 118 also permits tandem switching of emergency calls to the PSAP 122. Each emergency call to the PSAP 122 is also transmitted with an automatic number identification (ANI). The ALI database 124a in the emergency system 124 uses the ANI to update the data stored therein and to determine the location of the caller 102 by correlating the ANI with the data stored therein. This location and telephone number information is provided to the PSAP agent, who is able to route the emergency services to the proper location and to return the call of the caller 102 in the event the call is terminated in an untimely fashion.

Figure 2:
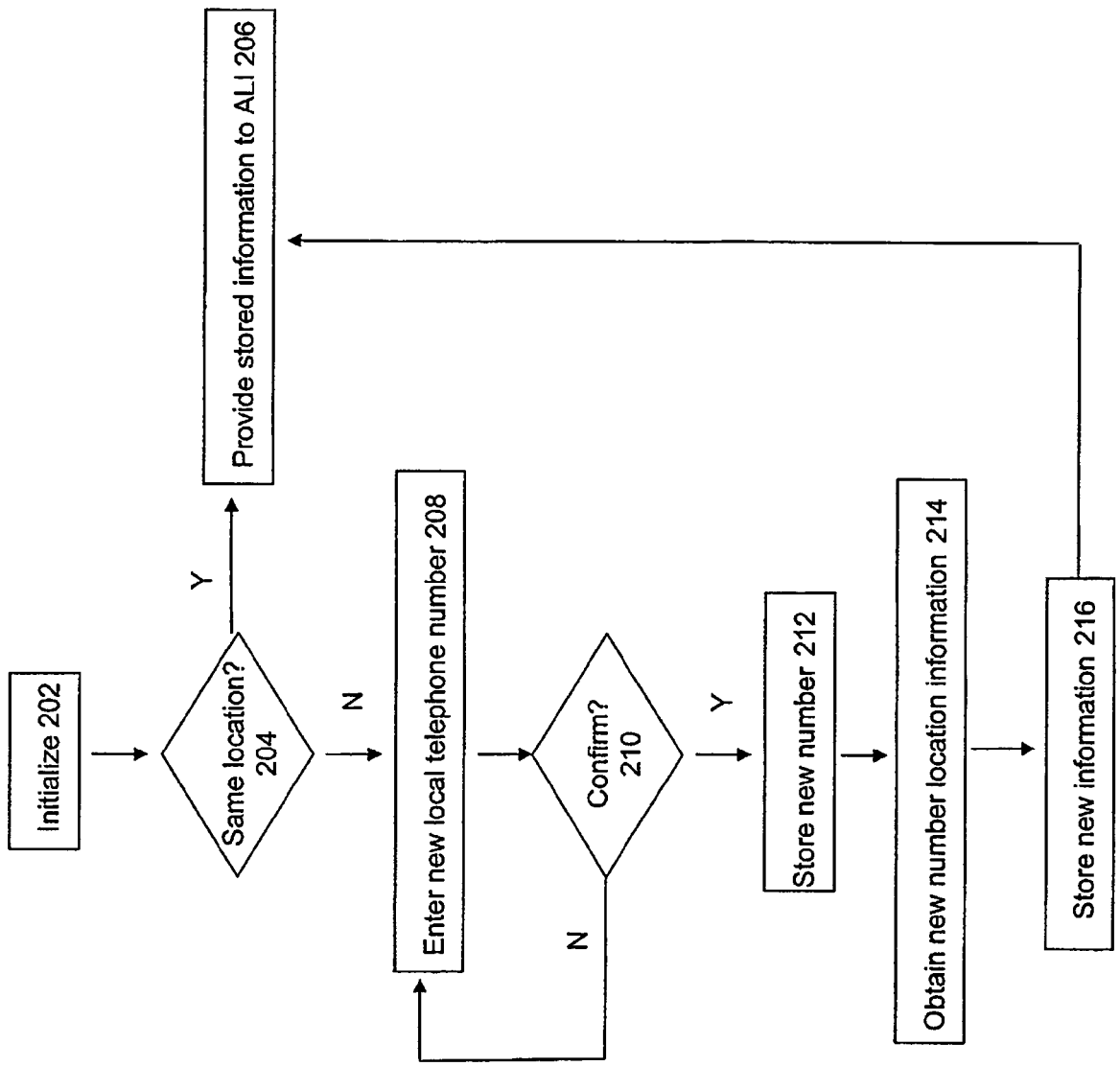
FIG. 2 is flowchart showing an embodiment of a VoIP method after initialization.

FIG. 2 shows one embodiment of a method by which the VoIP device ensures the availability of proper information for routing an emergency assistance call. In the flowchart of FIG. 2, after the VoIP device has been moved from one location to another, the VoIP device enters an initialization mode 202 in which the user is not permitted to make telephone calls. The VoIP can be relocated in a location having a limited area such as a home, or location having a large amount of area such as an office building or hotel in which multiple rooms and floors exist and house different individuals. For the purposes of convenience, herein the description of initialization mode is limited to preparation of the VoIP device to make emergency assistance calls in which the correct information is provided to the proper emergency assistance response unit. In general, when the VoIP device is moved, the VoIP device is powered down and then powered back up. Before permitting any phone calls to be made, the VoIP service provider queries the user as to whether the VoIP device has been moved 204. More specifically, the user enters whether the VoIP device has been moved to be more proximate to a fixed address different than the fixed address stored in memory and to which emergency responses are to be directed. This permits the user to use previously stored information if the VoIP device has been moved locally (e.g. within the same building) or there has been a power outage, for example. Storing the number on the VoIP device allows the user to more rapidly share the local telephone number with their VoIP provider if they continue to work from the same location at different points in time. Accordingly, if the user indicates that the previously stored information remains valid for emergency response purposes, the VoIP service provider switches the user's service into the normal mode in which telephone calls can be made. The local telephone number can be provided to the ALI database when the emergency number is called or prior to the emergency number being called 206.

On the other hand, if the user indicates that the previously stored information does not remain valid for emergency response purposes, the VoIP device continues in initialization mode and the VoIP service provider requests the user to enter the telephone number of the present location 208. This telephone number is a landline or other telephone number of a fixed location and can be, for example, the telephone number of a hotel in which the user is staying or of a company in which the user is presently conducting business. The VoIP service provider may then request that the user confirm that the telephone number entered is correct while continuing to display the telephone number entered 210 either on the VoIP device's display or on a web page of the VoIP service for a specific end user. In this case, if the user indicates that he/she has made an error entering the new telephone number, the VoIP service provider requests that the user reenter the correct new local telephone number. If the user indicates that the new telephone number entered is correct, the VoIP device then stores the new telephone number in memory 212. The VoIP service provider also stores this number and obtains the location information from a reverse lookup directory available on the Internet. In this case, the location information of the new telephone number will be stored appropriately by the service provider for use when processing a 911 emergency call from the VoIP phone, and may also be stored in memory 214 and, if desired, displayed on a screen on the VoIP device's display or on the end user specific VoIP service's web page for a predetermined amount of time for the user. The VoIP service provider switches the user's VoIP service into the normal mode in which telephone calls can be made using the newly stored information if an emergency phone call is made 206.

In addition to entering the local telephone number, the VoIP user may provide his/her current location. However, there are inherent difficulties associated with the VoIP user entering the address alone to the VoIP device to provide the correct information to the system and permit correct routing and match up with the 911 database. In many instances, the VoIP user may not know the local address or may be unsure as to the exact number or street name, which can be problematic when attempting to dispense emergency services. For example, a slight change such as the use of "avenue" instead of "street" after the street name may cause misinformation to be passed to the emergency services as some communities reuse the street name with the only difference being the designator following the street name (e.g., St. Charles, Ill. has Eleventh Avenue and Eleventh Street, about two miles apart). In another example, inputting an incorrect directional description such as North instead of South or West may cause problems (e.g. Bartlett, Ill. has Apple Tree Lane, which makes a 90 degree turn and changes numbering from South Apple Tree Lane to West Apple Tree Lane, with the same number ranges for both sections of the street). Another mistake could be as simple as forgetting the street name and entering Elm Tree instead of Elm Grove, assuming there is an Elm Tree in that community. Thus, it is easy for a user to unintentionally input an incorrect address that would appear valid to the VoIP service provider, but would result in emergency services being sent to the wrong location in the event the VoIP customer has an emergency and places a 911 call.

Figure 3:
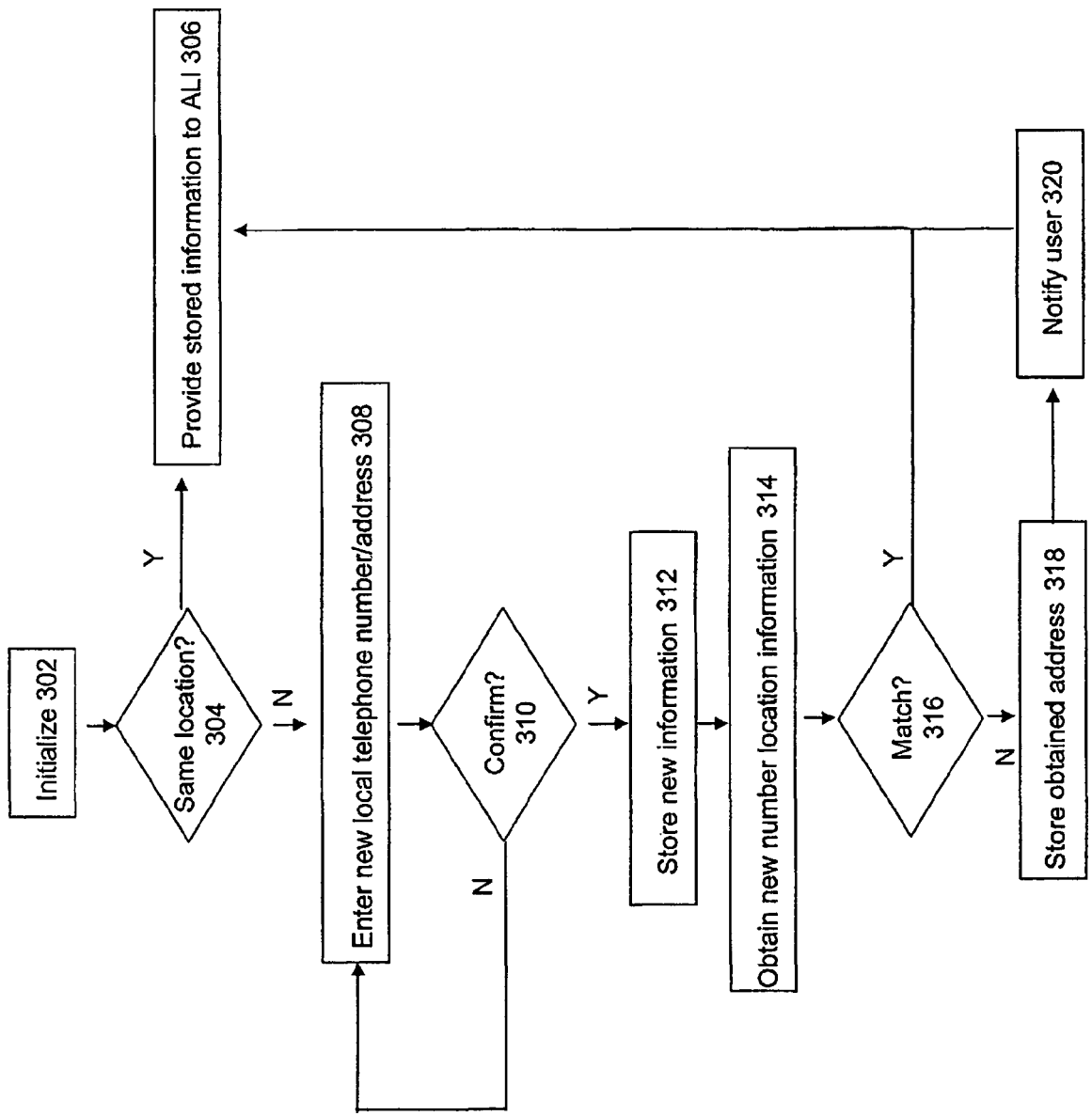
FIG. 3 is flowchart showing another embodiment of a VoIP method after initialization.

FIG. 3 shows another embodiment of a method by which the VoIP device ensures the availability of proper information for routing an emergency assistance call. In the flowchart of FIG. 3, both a local telephone number and address are entered. In this embodiment, after the VoIP device has been moved from one location to another, the VoIP device again enters an initialization mode 302 in which the VoIP device queries the user as to whether the VoIP device has been moved 304 before permitting any phone calls to be made. If the user indicates that the previously stored information remains valid for emergency response purposes, the VoIP service provider switches the user's service into the normal mode in which telephone calls can be made. The local telephone number can be provided to the ALI database when the emergency number is called or prior to the emergency number being called 306.

On the other hand, if the user indicates that the previously stored information does not remain valid for emergency response purposes, the VoIP device continues in initialization mode and the VoIP service provider requests the user to enter the telephone number and address of the present location 308. The VoIP service provider may then again request that the user confirm that the telephone number and/or address entered is correct while continuing to display the information entered 310 either on the VoIP device's display or on the end user specific VoIP service's web page. If the user indicates that he/she has made an error entering the information, the user reenters the telephone number and/or address, this time using the correct information. If the user indicates that the information entered is correct, the VoIP device then stores the new telephone number in memory 312, and is stored by the VoIP service provider. The new address may also be stored in memory.

In addition, the VoIP service provider may check the entered information against location information from the reverse lookup directory over the internet 314, as well as against a Master Street Address Guide (MSAG). The MSAG, which is defined by NENA as "A data base of street names and house number ranges within their associated communities defining Emergency Service Zones (ESZs) and their associated Emergency Service Numbers (ESNs) to enable proper routing of 9-1-1 calls." Use of the MSAG is shown in FIG. 3, as the address associated with the telephone number will have already been validated against the MSAG. However, the MSAG may be consulted when the address does not match the address associated with the entered telephone number.

In this case, the location information of the new telephone number is checked against the reverse lookup information to see if the address information matches 316. If they match, the VoIP service provider switches the user's VoIP service into the normal mode 306. If they do not match, the VoIP service provider replaces the entered address information with the information from the directory 318 and may notify the user of the correct address, displaying it on a screen for a predetermined amount of time for the user to view and perhaps accompanying the display with a sound indicating that the entered address is incorrect. The VoIP service provider then switches the user's VoIP service into the normal mode 306.

Alternatively, the location of the VoIP device can be accurately determined without the user having to input any information by the automatic locator 104d. One example of an automatic locator 104d is a Global Positioning System (GPS) device. While future VoIP devices may incorporate GPS devices, presently, VoIP devices in general do not contain GPS devices. However, GPS devices may be added to the current VoIP devices. Thus, in various embodiments, the VoIP device may request a user to input current information about his/her location including the local telephone number, which may also be relatively inexpensive and easy to implement, if a less intrusive method is desired, automatic location may be performed. The automatic location may also be performed using hardware and/or software in addition to, or instead of, the hardware and/or software in the VoIP device.

In embodiments in which user entry is desired, the VoIP service provider may restrict the VoIP service of the user, and upon validating the location of the VoIP device restore full VoIP service functionality. The VoIP service provider accordingly may make the decision on which PSAP should receive the 911 call, and manages the delivery of the call to the correct Selective Router (which will complete the call to the correct PSAP).

Figure 4:
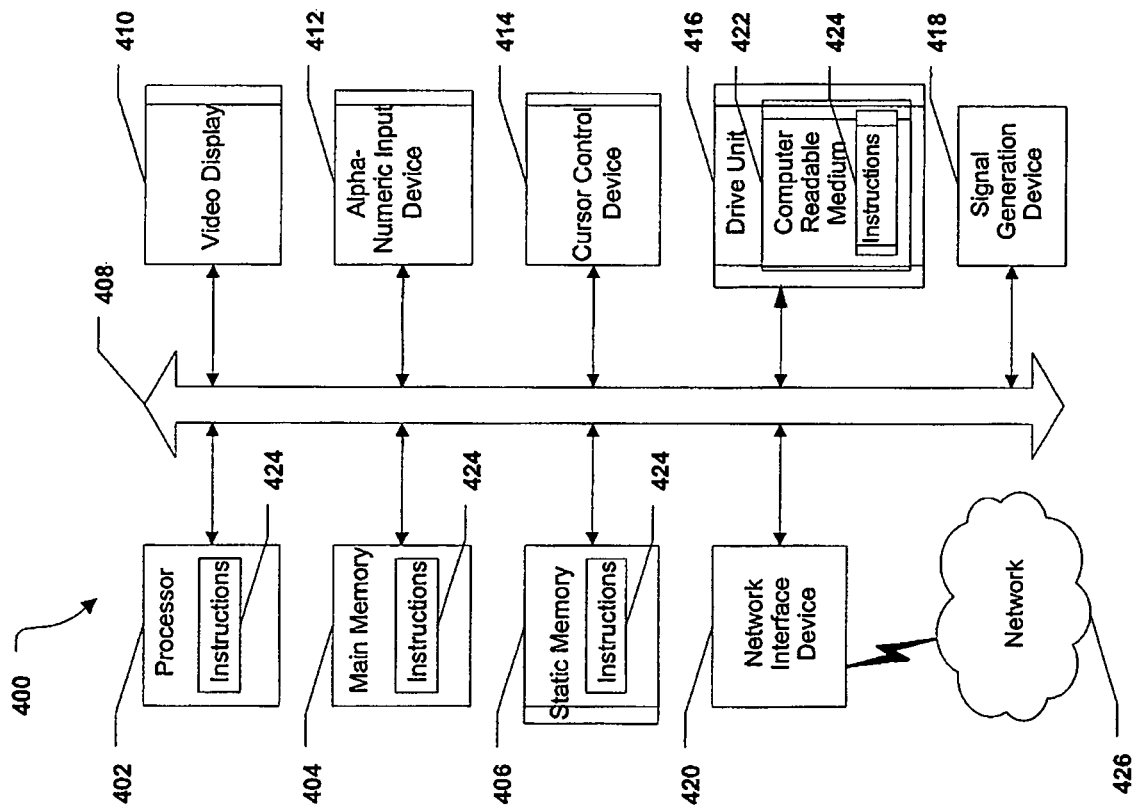
FIG. 4 illustrates an embodiment of a computer system containing a VoIP device.

Referring now to FIG. 4, an illustrative embodiment of a general computer system associated with the VoIP device is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

Alternatively, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal; so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

I claim:

1. A method for storing a local telephone number for a voice over Internet protocol device of a user, the method comprising:
   detecting, by a processor, a network connection event of the voice over internet protocol device of the user;
   sending, by the processor, a request to the voice over internet protocol device for the user to provide the local telephone number;
   receiving, by the processor, in response to the request the local telephone number serving a location, wherein the local telephone number is received from the voice over internet protocol device, wherein the local telephone number has been entered using the voice over internet protocol device;
   storing, by the processor, the local telephone number in a database of a voice over internet protocol service provider, wherein the local telephone number is associated with a fixed address of the location that is also the location of the voice over internet protocol device, wherein the local telephone number is not a number of the voice over internet protocol device and not associated with the user, wherein the local telephone number is stored after the local telephone number has been entered using the voice over internet protocol device;
   determining, by the processor, the fixed address from a reverse lookup directory using the local telephone number;
   storing, by the processor, the fixed address, determined from the reverse lookup directory, in the database of the voice over internet protocol service provider;
   providing, by the processor, the local telephone number to an automatic location information database associated with an emergency response system;
   determining whether the voice over internet protocol device has been moved to a new location more proximate to a different fixed address than the fixed address stored in the database of the voice over internet protocol service provider;
   when the voice over internet protocol device has been moved to the new location, storing a new local telephone number of the different fixed address into the database of the voice over internet protocol service provider; and
   providing the new local telephone number to the automatic location information database.

2. The method of claim 1, further comprising:
   storing the local telephone number into a memory of the voice over internet protocol device.

3. The method of claim 1, further comprising:
   when the voice over internet protocol device has been moved, displaying the new local telephone number and requesting a confirmation that the new local telephone number is correct prior to storing the new local telephone number.

4. The method of claim 1, further comprising:
   displaying the fixed address, determined from the reverse lookup directory, on a display of the voice over internet protocol device.

5. The method of claim 1, further comprising:
   when the voice over internet protocol device has been moved, storing the new local telephone number and the different fixed address in the database of the voice over internet protocol service provider.

6. The method of claim 5, further comprising:
   entering the new local telephone number and the different address using the voice over internet protocol device;
   displaying the new local telephone number and the different address; and
   requesting a confirmation that the new local telephone number and the different address are correct prior to storing the new local telephone number.

7. The method of claim 6, further comprising:
   determining a look up address from a reverse lookup directory using the stored telephone number;
   determining whether the fixed address entered matches the look up address; and
   when the fixed address matches the look up address, using the fixed address as the fixed address stored in the database of the voice over internet protocol service provider, and when the fixed address does not match the look up address, storing the look up address as the fixed address in the database of the voice over internet protocol service provider.

8. The method of claim 7, further comprising:
   when the fixed address does not match the look up address, displaying the look up address on a display of the voice over internet protocol device.

9. The method of claim 1, further comprising:
   providing the local telephone number to the automatic location information database when an emergency number is called using the voice over internet protocol device.

10. A non-transitory computer readable medium containing instructions which, when executed by a processor, cause the processor to perform operations for providing storing a local telephone number for a voice over Internet protocol device of a user, the operations comprising:
    detecting a network connection event of the voice over internet protocol device of the user;
    sending a request to the voice over internet protocol device for the user to provide the local telephone number;
    receiving, in response to the request, the local telephone number serving a location, wherein the local telephone number is received from the voice over internet protocol device,
    storing the local telephone number in a database of a voice over internet protocol service provider, wherein the local telephone number is associated with a fixed address that is also the location of the voice over internet protocol device, wherein the local telephone number is not a number of the voice over internet protocol device and not associated with the user, wherein the local telephone number is stored after the local telephone number has been entered using the voice over internet protocol device;
    determining the fixed address from a reverse lookup directory using the local telephone number;

storing the fixed address, determined from the reverse lookup directory, in the database of the voice over internet protocol service provider;

providing the local telephone number to an automatic location information database associated with an emergency response system;

determining whether the voice over internet protocol device has been moved to a new location more proximate to a different fixed address than the fixed address stored in the database of the voice over internet protocol service provider; and when the voice over internet protocol device has been moved to the new location, storing a new local telephone number of the different fixed address in the database of the voice over internet protocol service provider and providing the new local telephone number to the automatic location information database.

11. The non-transitory computer readable medium of claim 10, wherein the providing the local telephone number to the automatic location information database comprises providing the local telephone number to the automatic location information database when an emergency number is called using the voice over internet protocol device.

12. The non-transitory computer readable medium of claim 10, wherein the operations further comprise:
storing the local telephone number into a memory of the voice over internet protocol device.

13. The non-transitory computer readable medium of claim 10, wherein the operations further comprise:
when the voice over internet protocol device has been moved, displaying the new local telephone number and requesting a confirmation that the new local telephone number is correct prior to storing the new local telephone number.

14. The non-transitory computer readable medium of claim 10, wherein the operations further comprise:
displaying the look up address on a display of the voice over internet protocol device.

15. The non-transitory computer readable medium of claim 10, wherein the operations further comprise:
when the voice over internet protocol device has been moved, storing the new local telephone number and the different fixed address in the database of the voice over internet protocol service provider.

16. The non-transitory computer readable medium of claim 15, wherein the operations further comprise:
accepting the new local telephone number and the different address entered using the voice over internet protocol device;
displaying the new local telephone number and the different address; and
requesting a confirmation that the new local telephone number and the different address are correct prior to storing the new local telephone number.

17. The non-transitory computer readable medium of claim 16, wherein the operations further comprise:
determining a look up address from a reverse lookup directory using the stored telephone number;
determining whether the fixed address entered matches the look up address; and
when the fixed address matches the look up address, using the fixed address as the fixed address stored in the database of the voice over internet protocol service provider, and when the fixed address does not match the look up address, storing the look up address as the fixed address in the database of the voice over internet protocol service provider.

18. The non-transitory computer readable medium of claim 17, wherein the operations further comprise:
when the fixed address does not match the look up address, displaying the look up address on a display of the voice over internet protocol device.

19. An apparatus for storing a local telephone number for a voice over internet protocol device of a user, comprising:
a processor;
and a computer-readable medium storing a plurality of instructions which, when executed by the processor, cause the processor to perform operations, the operations comprising:
detecting a network connection event of the voice over internet protocol device of the user;
sending a request to the voice over internet protocol device for the user to provide the local telephone number;
receiving, in response to the request, the local telephone number serving a location, wherein the local telephone number is received from the voice over internet protocol device, wherein the local telephone number has been entered using the voice over internet protocol device;
storing the local telephone number in a database of a voice over internet protocol service provider, wherein the local telephone number is associated with a fixed address that is also the location of the voice over internet protocol device, wherein the local telephone number is nota number of the voice over internet protocol device and not associated with the user, wherein the local telephone number is stored after the local telephone number has been entered using the voice over internet protocol device;
determining the fixed address from a reverse lookup directory using the local telephone number;
storing the fixed address, determined from the reverse lookup directory, in the database of the voice over internet protocol service provider;
providing the local telephone number to an automatic location information database associated with an emergency response system;
determining whether the voice over internet protocol device has been moved to a new location more proximate to a different fixed address than the fixed address stored in the database of the voice over internet protocol service provider; and
when the voice over internet protocol device has been moved to the new location, storing a new local telephone number of the different fixed address into the database of the voice over internet protocol service provider; and
providing the new local telephone number to the automatic location information database.

20. The apparatus of claim 19, wherein the operations further comprise:
storing the local telephone number into a memory of the voice over internet protocol device.

21. The apparatus of claim 19, wherein the operations further comprise:
when the voice over internet protocol device has been moved, displaying the new local telephone number and requesting a confirmation that the new local telephone number is correct prior to storing the new local telephone number.

22. The apparatus of claim 19, wherein the operations further comprise:

displaying the fixed address, determined from the reverse lookup directory, on a display of the voice over internet protocol device.

23. The apparatus of claim 20, wherein the operations further comprise:
   when the voice over internet protocol device has been moved, storing the new local telephone number and the different fixed address in the database of the voice over internet protocol service provider.

24. The apparatus of claim 23, wherein the operations further comprise:
   accepting the new local telephone number and the different address entered using the voice over internet protocol device;
   displaying the new local telephone number and the different address; and
   requesting a confirmation that the new local telephone number and the different address are correct prior to storing the new local telephone number.

25. The apparatus of claim 24, wherein the operations further comprise:
   determining a look up address from a reverse lookup directory using the stored telephone number;
   determining whether the fixed address entered matches the look up address; and
   when the fixed address matches the look up address, using the fixed address as the fixed address stored in the database of the voice over internet protocol service provider, and when the fixed address does not match the look up address, storing the look up address as the fixed address in the database of the voice over internet protocol service provider.

* * * * *